United States Patent [19]
Friedmann et al.

[11] Patent Number: 5,879,253
[45] Date of Patent: Mar. 9, 1999

[54] TORQUE MONITORING APPARATUS

[75] Inventors: Oswald Friedmann, Lichtenau; Armin Veil, Ottersweier-Unzhurst, both of Germany

[73] Assignee: Luk Getrieb-Systeme GmbH, Buhl, Germany

[21] Appl. No.: 979,219

[22] Filed: Nov. 26, 1997

Related U.S. Application Data

[62] Division of Ser. No. 568,134, Dec. 6, 1995, Pat. No. 5,711,730.

[30] Foreign Application Priority Data

Dec. 6, 1994 [DE] Germany .......................... 44 43 332.8

[51] Int. Cl.$^6$ .................................................. F16H 61/00
[52] U.S. Cl. ................................ 474/18; 474/28; 474/70
[58] Field of Search .............................. 474/18, 28, 69, 474/70; 477/38, 39, 45, 46

[56] References Cited

U.S. PATENT DOCUMENTS

| | | |
|---|---|---|
| 3,698,256 | 10/1972 | Albertson . |
| 4,261,213 | 4/1981 | Rattunde ................................ 474/28 X |
| 4,589,858 | 5/1986 | Gaddi .......................................... 474/12 |
| 4,619,629 | 10/1986 | Shigematsu et al. ................. 474/18 X |
| 4,631,043 | 12/1986 | Tokoro et al. .............................. 474/18 |
| 4,673,328 | 6/1987 | Tokoro et al. .............................. 474/18 |
| 4,722,718 | 2/1988 | Eugen ......................................... 474/19 |
| 4,881,925 | 11/1989 | Hattori ....................................... 474/18 |
| 5,045,028 | 9/1991 | Rattunde et al. .......................... 474/17 |
| 5,046,991 | 9/1991 | Friedmann ................................ 474/18 |
| 5,108,348 | 4/1992 | Bornmann ................................. 474/18 |
| 5,169,365 | 12/1992 | Friedmann ................................ 474/18 |
| 5,201,687 | 4/1993 | Friedmann ................................ 474/18 |
| 5,217,412 | 6/1993 | Indlekofer et al. ........................ 474/69 |
| 5,295,915 | 3/1994 | Friedmann ................................ 474/18 |
| 5,711,730 | 1/1998 | Friedmann et al. ....................... 474/18 |

Primary Examiner—Roger Schoeppel
Attorney, Agent, or Firm—Darby &Darby

[57] ABSTRACT

A hydromechanical torque sensor having several plenum chambers can be utilized to transmit torque between the driving and driven parts in the power train of a motor vehicle as well as to make necessary adjustments in a hydraulically adjustable transmission. To this end, the plenum chambers of the torque sensor can be connected to or sealed from each other. The torque sensor and the transmission can receive fluid from discrete sources or from a single source by way of suitable valves.

3 Claims, 4 Drawing Sheets

TORQUE MONITORING APPARATUS

CROSS-REFERENCE TO RELATED CASE

This is a division of our patent application Ser. No. 08/568,134 filed Dec. 6, 1995, now U.S. Pat. No. 5,711,730 granted Jan. 27, 1998.

BACKGROUND OF THE INVENTION

The invention relates to power trains, particularly for use in motor vehicles for transmission of torque between a prime mover (such as an internal combustion engine) and one or more wheels. More particularly, the invention relates to improvements in power trains of the type wherein the means for transmitting at least a portion of torque from the rotary output element of a prime mover to a rotary driven element (such as the output shaft of an infinitely variable transmission) comprises a torque monitoring device or sensor with a normally annular plenum chamber for oil or another suitable hydraulic fluid. Still more particularly, the invention relates to improvements in power trains wherein the torque monitoring device or torque sensor comprises at least two elements forming part of a valve and being movable relative to each other to determine that pressure which is indicative of the torque being transmittable by the torque sensor. The valve communicates with the at least one plenum chamber and the torque sensor is preferably combined or combinable with an infinitely variable transmission of the type wherein an endless flexible element is trained over a pair of adjustable pulleys or sheaves.

Torque monitoring devices or sensors of the above outlined character are disclosed, for example, in German patent No. 28 28 347 as well as in published German patent applications Nos. 40 36 683, 42 34 294, 42 01 692 and 35 38 884. The torque sensors which are disclosed in these prior Publications are designed to establish a clamping engagement between component parts of a torque transmitting apparatus in dependency upon the load or in dependency upon the transmitted torque. As a rule, such torque sensors are designed to ensure a frictional engagement between component parts which are urged against or toward each other by a force depending at least upon the transmitted loads or upon the transmitted torque, namely in such a way that the force acting to urge the component parts into frictional engagement with one another at least approximates the force which is necessary for the transmission of torque. The application of an excessive force for urging the component parts against each other results in excessive wear whereas the application of an insufficient force entails a slip and hence again excessive wear between the parts which are maintained in frictional engagement with one another.

A conventional torque monitoring device or sensor constitutes, or can be said to constitute, a valve whose operation is dependent at least upon the magnitude of transmitted torque. Those portions of the torque sensor which are located downstream of the plenum chamber are constructed and assembled to constitute the aforementioned valve and the plenum chamber receives pressurized hydraulic fluid from a suitable pump. The valve acts as a flow restrictor or throttle which seals the path for the flow of fluid from the plenum chamber so that the pressure of fluid in the plenum chamber increases in response to abrupt rises (peaks) of transmitted torque. This entails a corresponding rise of fluid pressure in the plenum chamber as well as in the cylinder chamber or chambers of one or more cylinder and piston units which are provided to adjust the inifinitely variable transmission including a pair of adjustable sheaves and an endless flexible element which is trained over and serves to transmit torque between the adjustable sheaves. A rise of pressure in the cylinder chamber or chambers brings about a corresponding increase of the clamping force between the endless flexible element and the sheave or sheaves of the transmission. In other words, the frictional engagement between the sheave or sheaves on the one hand and the flexible element on the other hand increases in response to an increase of the transmitted torque and/or in response to the development of an abrupt rise or surge of transmitted torque.

In order to adjust the flow restrictor, heretofore known torque sensors comprise discs which are provided with confronting cam faces or ramps bearing upon rolling elements which are or which can be disposed between them with a force generated by the source of pressurized hydraulic fluid. If the transmitted torque develops peaks, especially peaks which develop in the torque being transmitted from the prime mover, the discs are caused to move axially and away from each other whereby an axially movable portion reduces the effective cross-sectional area of the outlet for the flow of hydraulic fluid from the plenum chamber at a rate which is proportional to the magnitude of the peaks of transmitted torque. In addition, the discs which are provided with the aforesaid cam faces or ramps serve as a means for mechanically transmitting at least a portion of the driving torque to adjust (such as reduce) the effective cross-sectional area of the outlet from the plenum chamber as a function of the magnitude of transmitted torque and to thus properly adjust the frictional clamping force between the adjustable sheaves and the endless flexible element of the infinitely variable transmission. The flexible element can constitute a belt or a chain; at this time, it is often preferred to employ a chain. As a rule, the flow restrictor permits the flow of hydraulic fluid therethrough except under certain circumstances of use of a prior torque sensor, such as in response to the development of highly pronounced peaks of transmitted torque. It follows that the pump or another suitable source of pressurized fluid must be capable of supplying the pressure which ensures a sufficiently pronounced engagement of the ramps or cam faces on the cam discs of the torqe sensor to transmit the required torque and which is needed to ensure that the fluid leaving the plenum chamber is maintained at a requisite pressure; the latter constitutes a permanent loss in pumping capacity.

It is also known to construct a torque sensor for use in the power train of a motor vehicle in such a way that the sensor can furnish a torque- and/or load-dependent pressure as well as a pressure which is a function of the ratio of the infinitely variable transmission. This necessitates a reducion of the clamping force upon the rolling elements between the faces or ramps of the clutch discs or analogous valving elements of a previously known torque sensor as well as between the endless flexible element and the adjustable sheaves of the infinitely variable transmission, especially when the power train is set up to operate within the partial-load range. Such design of the torque sensor renders it possible to reduce to a minimum losses developing as a result of frictional clamping engagement between he flexible element and the sheaves of the transmission. Thus, and when the infinitely variable transmission is set to operate in such a way that the looped portion of the flexible element which is trained over the torque transmitting (driving) sheave is located at a minimum radial distance from the rotational axis of this sheave, i.e., when the ratio of the transmission is reduced to a minimum value, the pressure supplied by the torque sensor is or can be greater than under those circumstances when the aforementioned looped portion of the flexible element is located at maximum radial distance from the axis of the driving sheave; at such time, the ratio of the infinitely variable transmission is maintained at a maximum value. It is assumed that the magnitude of the torque under the just outlined circumstances (namely when a looped portion of the flexible element is located at a minimal or at a maximal radial distance from the driving sheave) is constant.

The incorporation of heretofore known proposals to select the pressure of hydraulic fluid by the torque sensor as a function of a plurality variable parameters including a parameter constituting the ratio of the infinitely variable transmission is very expensive and contributes to the bulk of such power trains. The reason is that the reliance upon a second parameter, particularly the ratio of the transmission, is effective or reliable only if the machining tolerances are reduced to a minimum which is the primary cause of increased cost. Moreover, it is necessary to resort to a relatively large (or extremely large) number of additional conduits, bores and/or other passages as well as to additional valves which are or which can be quite complex and expensive and occupy a substantial amount of space. Reference may be had, for example, the the aforementioned published German patent application No. 42 01 692.

The disclosure in the patent application titled: "Power Train", Ser. No. 08/572,538, filed Dec. 14, 1995, inventor: Oswald Friedmann is hereby incorporated herein by this reference; and the disclosure in the patent application titled: "Power Train with Infinitely Variable Ratio Transmission", Ser. No. 08/772,536, filed Dec. 14, 1995, inventors: Oswald Friedmann, Urban Panther and Ivo Agner, is also hereby incorporated herein by this reference.

OBJECTS OF THE INVENTION

An object of the invention is to provide a novel and improved torque monitoring device or sensor which can be utilized with advantage in the power trains of motor vehicles.

Another object of the invention is to provide a power train which embodies the improved torque sensor.

A further object of the invention is to provide a torque sensor which can be utilized with advantage in combination with an infinitely variable transmission of the type having two adjustable sheaves and an endless flexible torque transmitting element trained over the sheaves.

An additional object of the invention is to provide a torque monitoring device or torque sensor with a plurality of plenum chambers.

Still another object of the invention is to provide a novel and improved method of installing the above outlined torque sensor.

A further object of the invention is to provide a novel and improved method of regulating the operation of the torque sensor.

Another object of the invention is to provide a torque sensor which can be put to use for operation in dependency upon the magnitude of transmitted torque as well as in dependency upon at least one additional variable parameter.

An additional object of the invention is to provide a torque sensor which can be put to use for operation in dependency upon the desired or selected ratio of the infinitely variable transmission.

Still another object of the invention is to provide a motor vehicle including a power train which embodies the above outlined torque sensor.

A further object of the invention is to provide a simple, compact and inexpensive but highly reliable and versatile torque sensor.

SUMMARY OF THE INVENTION

One feature of the present invention resides in the provision of a fluid-operated torque sensor which can be used between a rotary torque transmitting driving member (e.g., a shaft which is driven by the combustion engine of a motor vehicle) and a rotary torque receiving driven member (e.g., a shaft which can transmit torque to a differential in the power train of a motor vehicle) and is arranged to transmit at least a portion of torque from the driving member to the driven member as well as to receive a pressurized fluid (e.g., oil) from a source (such as a hydraulic pump). The improved torque sensor comprises a first plenum chamber for pressurized fluid, a throttle valve including at least two relatively movable valving elements (e.g., two rotary cam discs) which are arranged to select the pressure of fluid in the first plenum chamber to thus determine the magnitude of torque which is transmittable between the driving and driven members, and at least one second plenum chamber which is connectable with and is sealable from the first plenum chamber in dependency upon variations of at least one operational parameter (such as the ratio of the transmission).

The arrangement can be such that the pressure of fluid at least in the first plenum chamber of torque sensor is variable as a function of the establishment and interruption of connection between the first and second plenum chambers.

Each of the first and second plenum chambers is or can be provided with an outlet, and the valving elements are or can be operative to control the flow of fluid through such outlets, i.e., the throttle valve can be installed downstream of the plenum chambers, The torque sensor can comprise cylinders and pistons which bound the first and second plenum chambers and are movable relative to each other by the valving elements in the direction of an axis of one of the driving and driven members. The valving elements of such torque sensor can include cooperating cams or ramps which are arranged to transmit the aforementioned portion of torque between the driving and driven members.

The first and second plenum chambers can jointly provide a composite surface which is being acted upon by pressurized fluid in the direction of the common axis of the valving elements. Such surface is or can be enlarged in response to the establishment of a connection between the first and second plenum chambers.

When the torque sensor is set to transmit a predetermined torque between the driving and driven members, the pressure of fluid in the first plenum chamber is or can be higher when the first and second plenum chambers are sealed from each other but lower when the first and second plenum chambers are connected with one another.

Another feature of the invention resides in the provision of a power train which can be utilized in a motor vehicle and comprises a prime mover (e.g., a combustion engine) having a rotary torque transmitting driving or driver member (such as a shaft), a rotary torque receiving driven member (e.g., a second shaft which is or which can be parallel with the first shaft), and an infinitely variable ratio transmission which is disposed between the driving and driven members and includes a first adjustable sheave arranged to be driven by the driving member, a second adjustable sheave arranged to drive the driven member, an endless flexible element which is trained over the sheaves, and regulatable fluid-operated means for adjusting at least one of the sheaves to thus vary the intensity of engagement with the flexible element. The improved power train further comprises a fluid-operated torque sensor or torque monitoring device which is disposed between one of the driving and driven members and the respective sheave and is arranged to transmit at least a portion of torque from the diving member to the driven member as well as to receive a pressurized fluid from a source (e.g., one or more hydraulic pumps). The torque sensor comprises a first plenum chamber for pressurized fluid, a throttle valve including at least two relatively movable valving elements (such as the aforementioned cam discs) which are arranged to select the pressure of fluid in the first plenum chamber to thus determine the magnitude of torque which is transmittable by the torque sensor, at least one second plenum chamber which is connectable with and sealable from the first plenum chamber in dependency upon variations of at least one operational parameter (such as the ratio of the transmission), means for applying to the adjusting means a fluid pressure which is a function of the selected fluid pressure, and means for connecting the first and second plenum chambers with and for sealing the first and second plenum chambers from each other as a function of variations of the ratio of the transmission.

The arrangement can be such that the source of pressurized fluid is connectable with the first plenum chamber at least during a stage of a reduction of the ratio of the transmission, i.e., when the flexible element is to drive the second sheave at a reduced rotational speed.

The aforementioned connecting/sealing means can be constructed, assembled and installed for such operation that it connects the first and second plenum chambers with each other at least during a certain stage of an increase of the ratio of the transmission, i.e., when the flexible element is to drive the second sheave at an increased rotational speed.

Still further, the connecting/sealing means can be operative to connect the first and second plenum chambers with and to seal the first and second plenum chambers from each other when the ratio of the transmission equals or at least approximates one-to-one.

At least one of the sheaves can include an axially fixed first rotary flange at one side of the flexible element and a second rotary flange adjacent the torque sensor, disposed at the other side of the flexible element and being movable axially toward and away from the first flange to thus vary the ratio of the transmission. The connecting/sealing means of such torque sensor is or can be operative to connect the first and second plenum chambers with and to seal such plenum chambers from each other in response to movements of the second flange relative to the first flange. The adjusting means can be operative to move the second flange and, to this end, can include a cylinder chamber for fluid at a pressure which is determined by the torque sensor. The cylinder chamber is connectable with and is sealable from the second plenum chamber in dependency upon the ratio of the transmission. The one member can include a shaft and the second flange can be mounted on and is then movable axially of such shaft; the connecting/sealing means can comprise means for centering the second flange on the shaft.

The first plenum chamber can be uninterruptedly connected with the source and with the adjusting means, and the connecting/sealing means is then operative, to connect the second plenum chamber with the first plenum chamber by way of the adjusting means to thus establish in the second plenum chamber a fluid pressure which is a function of fluid pressure in the first plenum chamber.

The torque sensor can further comprise a compensating valve which is operative in the course of the establishment of a connection between the first and second plenum chambers as well as during the establishment of a seal between the first and second plenum chambers to at least substantially equalize the fluid pressures in the first and second plenum chambers during the aforementioned establishment of a connection and/or a seal between the first and second plenum chambers. The compensating valve can include a check valve, and such check valve can include at least one lip seal which is installed between the first and second plenum chambers.

As already mentioned above, the adjusting means can include a cylinder chamber and the source of pressurized fluid can be connected at least with the second plenum chamber by way of the cylinder chamber.

The connecting/sealing means can comprise a switchover valve which is eccentric relative to the valving elements of the aforementioned throttle valve of the torque sensor. The adjusting means can include a piston portion and a cylinder portion, and the switchover valve can be carried by the piston portion or by the cylinder portion, A portion of the switchover valve can constitute a plunger which is movable by the axially movable flange of one of the sheaves forming part of the transmission.

The valving elements of the throttle valve forming part of the torque sensor are rotatable about a common axis, and the torque sensor can further comprise a flow restrictor which is eccentric relative to the common axis of the valving elements and includes means for regulating the fluid pressure at least in the first plenum chamber.

The transmission can comprise at least one fluid-operated adjusting means for each of the sheaves, and each of the adjusting means can include a cylinder chamber wherein the pressure of fluid is regulated by the torque sensor. At least one of the adjusting means can include a hydraulic cylinder and piston unit.

A further feature of the invention resides in the provision of a power train which comprises a prime mover having a rotary torque transmitting driving or driver member, a rotary torque receiving driven member, and an infinitely variable ratio transmission for transmission of torque between the driving and driven members. The transmission includes a first adjustable sheave which can be driven by the driving member, a second adjustable sheave which can transmit torque to the driven member, an endless flexible element (such as a chain) trained over the sheaves, and regulatable fluid-operated means for adjusting at least one of the sheaves to thus vary the intensity of frictional engagement with the flexible element. The power train further comprises at least one hydromechanical torque monitoring device or sensor which is installed in a flow of torque between one of the driving and driven members and one of the sheaves and is arranged to transmit at least a portion of torque from the driving member to the driven member, to vary the torque transmitting capacity of the transmission by regulating the pressure of fluid in the adjusting means, to receive a pressurized fluid from a suitable source and to modulate the pressure of fluid which is being supplied by the source at least as a function of torque to be transmitted by the torque sensor. The torque sensor comprises at least two plenum chambers for reception of pressurized fluid, and such plenum chambers are connected in parallel and are defined by coaxial and relatively movable components of the torque sensor. The latter further comprises means for connecting the plenum chambers with and for sealing the plenum chambers from each other in dependency upon variations of the ratio of the transmission. The source of pressurized fluid can comprise at least one hydraulic pump, and at least one of the adjusting means for the sheaves of the transmission can comprise at least one cylnder and piston unit.

The novel features which are considered as characteristic of the invention are set forth in particular in the appended claims. The improved torque sensor itself, however, both as to its construction and the mode of installing and utilizing the same, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
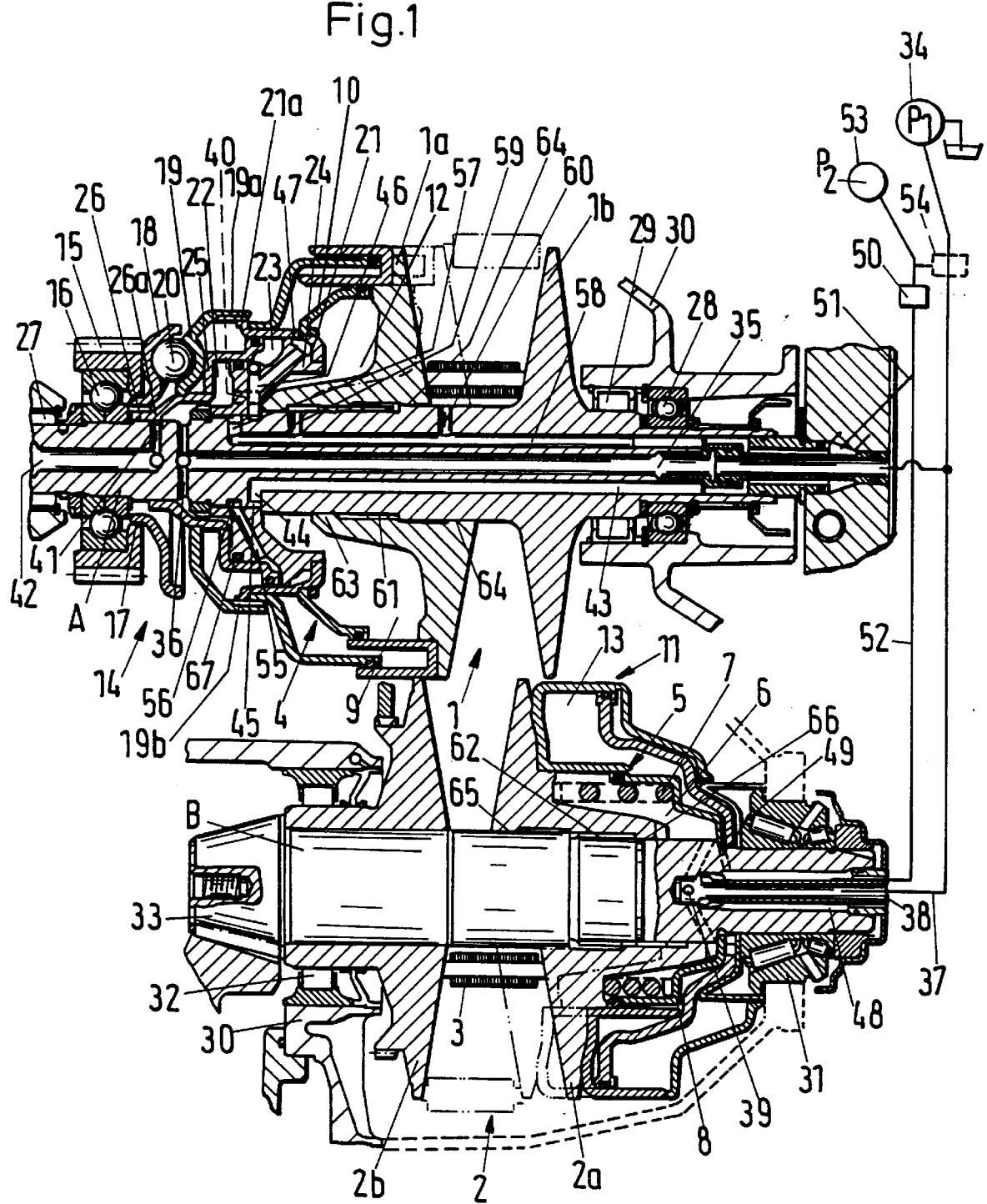
FIG. 1 is an axial sectional view of a power train which can be utilized in a motor vehicle and includes a torque monitoring device or sensor embodying one form of the present invention.
Figure 1A:
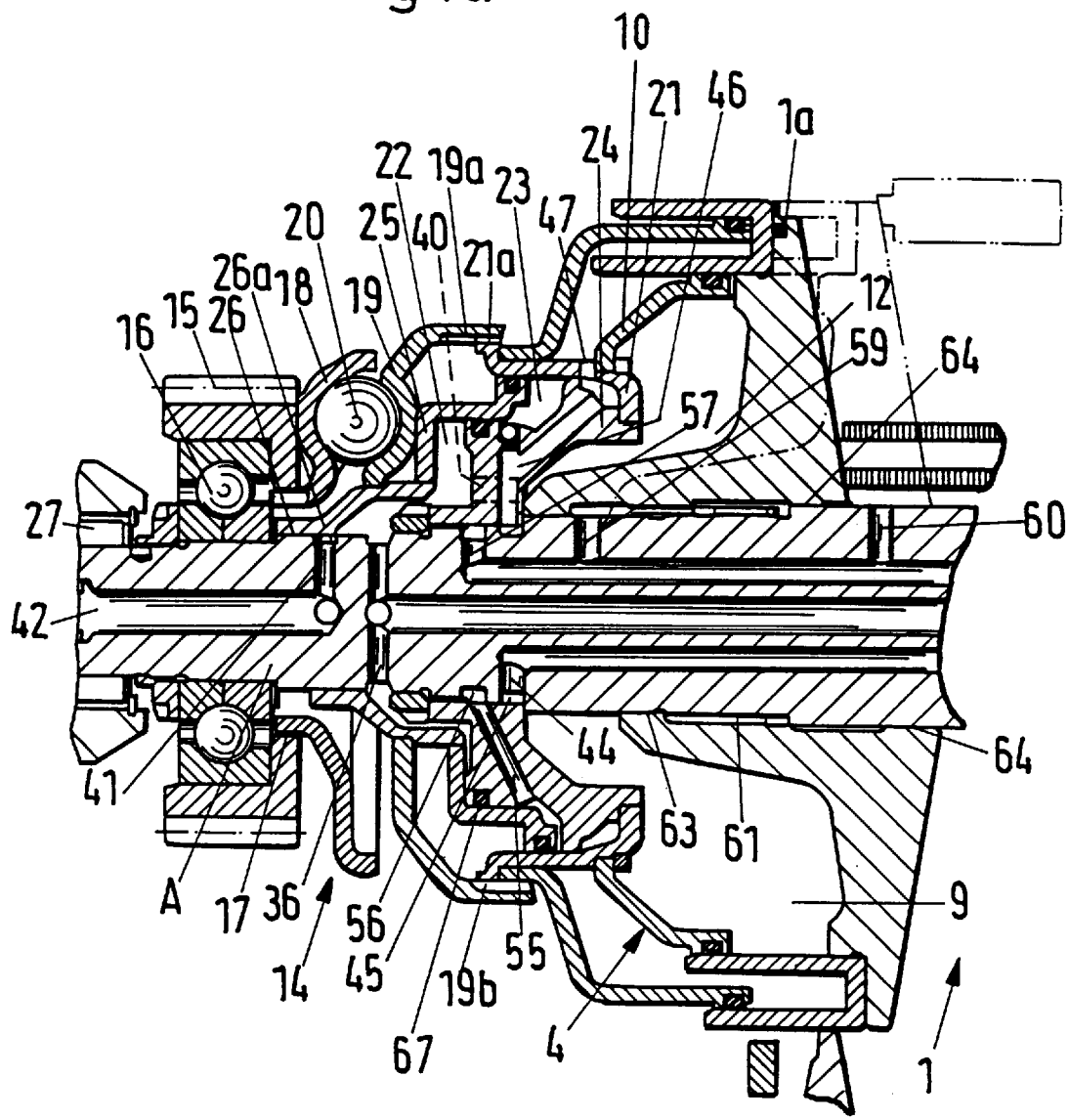
FIG. 1a is an enlarged view of a detail in the power train of FIG. 1, and more specifically of the torque sensor.

Referring first to FIGS. 1 and 1a, there is shown an infinitely variable transmission including a first adjustable sheave 1, a second adjustable sheave 2 and an endless flexible element 3 (e.g., a chain) which is trained over and transmits torque between the two sheaves. The sheave 1 is non-rotatably carried by a rotary input member A here shown as a shaft which is parallel to a rotary output member B including or constituting a shaft which supports and is non-rotatably connected with the sheave 2. The sheaves 1 and 2 respectively comprise axially movable first flanges 1a and 2a and axially fixed second flanges 1b, 2b.

The flange 1a is located at a maximum distance from the flange 1b (this is shown by solid lines in the upper part of the sheave 1) and the flange 2a is located at a minimum axial distance from the flange 2b (this shown by solid lines in the upper half of the shave 2) when the ratio of the infinitely variable transmission including the sheaves 1, 2 and the flexible element 3 assumes a minimum value. The transmission then constitutes or acts as an underdrive wherein the RPM of the shaft A can greatly exceed the RPM of the shaft B. On the other hand, if the axially movable flange 1a is caused to move to a position at a minimum axial distance from the axially fixed flange 1b (as shown by solid lines in the lower half of the sheave 1), the flange 2a is located at a maximum axial distance from the flange 2b (this is shown in the lower half of the sheave 2) and the transmission constitutes or acts as an overdrive because the RPM of the sheave 2 and shaft B exceeds the RPM of the sheave 1 and shaft A by a maximum value.

The means for adjusting the sheave 1 (i.e., for moving the flange 1a axially and relative to the flange 1b) comprises a hydraulically operated cylinder and piston unit 4, and the means for adjusting the sheave 2 (by moving the flange 2a axially and relative to the flange 2b) comprises a hydraulically operated cylinder and piston unit 5. The chamber 6 of the adjusting unit 5 comprises at least one energy storing element here shown as a coil spring 7 which biases the axially movable flange 2a in a direction toward the axially fixed flange 2b. The bias of the coil spring 7 increases in response to movement of the flange 2a axially and away from the flange 2b, i.e., when that (looped) portion of the flexible element 3 which is trained over the sheave 2 is permitted or caused to assume a position at a minimum distance from the common axis of the shaft B and sheave 2. Otherwise stated, the bias of the spring 7 increases in response to a rise of the ratio of the transmission in a sense to increase the RPM the shaft B relative to the RPM of the shaft A. The coil spring 7 reacts against a cupped member 8 which is rigidly secured to the shaft B, and this spring bears (or can bear) directly upon the axially movable flange 2a of the sheave 2.

The adjusting unit 4 operates in parallel with an adjusting unit 10, and the adjusting unit 5 operates in parallel with an adjusting unit 11. Each of the units 10, 11 also constitutes a hydraulically operated cylinder and piston unit or assembly. The purpose of the adjusting units 10, 11 is to vary the ratio of the transmission including the sheaves 1, 2 and the flexible element 3. The adjusting unit 10 has a cylinder chamber 12, and the adjusting unit 11 has a cylinder chamber 13. The ratio of the transmission is changed in response to admission of pressurized hydraulic fluid into and in response to evacuation of such fluid from the chambers 12 and 13. To this end, the chambers 12, 13 can be connected to a source of pressurized hydraulic fluid (such as a pump) or with one or more fluid evacuating channels, conduits and/or other suitable passages. If the ratio of the transmission is to be changed, one of the chambers 12, 13 receives pressurized fluid to increase its volume whereas the contents of the other of these chambers are evacuated, at least in part, to reduce its volume. The means for regulating the admission of fluid into and the evacuation of fluid from the cylinder chambers 12, 13 includes one or more suitable valves. Suitable valves are disclosed in the aforementioned prior art. For example, the published German patent application No. 40 36 683 shows, in FIG. 2, a so-called square slide gate or valve 36 which can regulate the flow of fluid furnished by a source in the form of a pump 14. A similar or identical valve can be used in the infinitely variable transmission of FIGS. 1 and 1a to regulate the flow of fluid into and from the cylinder chambers 12 and 13.

The power train which is shown in FIGS. 1 and 1a further comprises a hydromechanical torque monitoring device or sensor 14 serving to generate or establish a pressure which depends at least upon the magnitude of transmitted torque. In the embodiment which is shown in FIGS. 1 and 1a, the torque sensor 14 is constructed, assembled and installed to transmit torque from a driver gear or pinion 15 to the first sheave 1 of the infinitely variable transmission. The driver pinion 15 is mounted on an antifriction bearing 16 which surrounds the input shaft A. The driver pinion 15 can transmit torque to a rotary cam disc 18 of the torque sensor 14 by way of a form-locking connection 17, e.g., a set of mating gears. The cam disc 18 is held in an axially fixed position by the driver pinion 15 and cooperates with an axially movable second cam disc 19 of the torque sensor 14. The cam discs 18, 19 have confronting cam faces (e.g., in the form of ramps) which abut one or more spherical spreading elements 20 between the discs 18, 19. The cam-disc 19 is free to move axially of but cannot rotate relative to the input shaft A. To this end, the cam disc 19 comprises a radially outer portion 19a which extends axially of the shaft A and away from the spreading elements 20 and includes a year 19b in mesh with a complementary gear 21a on a member 21 which is mounted on and cannot rotate and/or move axially relative to the shaft A. However, the gears 19b, 21a permit axial movements of the cam disc 19 relative to the member 21 and shaft A.

The component parts of the torque sensor 14 define two plenum chambers 22 and 23. Such component parts can be said to constitute or resemble walls including a ring-shaped member 24 and members 25, 26 which are carried by or form part of the cam disc 19. The members 24, 25 and 26 define the plenum chamber 22. The member 24 is rigidly secured to the shaft A and the illustrated members 25, 26 are shown as separately produced parts (see particularly FIG. 1a) which are non-rotatably affixed to the cam disc 19. The plenum chamber 23 extends radially outwardly beyond and is axially offset relative to the plenum chamber 22. This second plenum chamber 23 is bounded in part by the ring-shaped member 24, by the (substantially or partly sleeve-like) member 21 which is fixedly connected to the member 24, and by the ring-shaped member 25 which, as already stated above, forms part of or is affixed to the cam disc 19. The latter is movable axially of the shaft A and performs the function of a piston.

The input shaft A is mounted in a housing 30 by way of a needle bearing 27 which is disposed at the left-hand side of the torque sensor 14 (as viewed in FIGS. 1 and 1a) and by way of a thrust roller bearing 28 and a radial roller bearing 29 disposed at the other side of the adjustable sheave 1 (as viewed in FIG. 1). The output shaft B is also mounted in the housing 30, namely in a twin antifriction rolling bearing 31 at the right-hand side of the adjusting units 5 and 11 for the axially movable flange 2a of the sheave 2 on the shaft B, and an antifriction roller bearing 32 to the left of the sheave 2, all as viewed in FIG. 1. The twin antifriction bearing 31 is designed to take up radial stresses as well as two-directional axial stresses. The left-hand axial end of the driven shaft B is provided with a bevel gear 33 which can be moved into mesh with a complementary gear in the differential of a power train of a motor vehicle or with a complementary gear which is operatively connected with the differential.

In order to generate a pressure which is modulated at least in dependency upon the magnitude of transmitted torque and which is necessary in order to effect appropriate frictional clamping engagement between the flanges of the sheaves 1, 2 and the flexible element 3 forming part of the infinitely variable transmission, the torque sensor 14 is operatively connected with a source of pressurized hydraulic fluid here shown as a pump 34. The outlet of the pump 34 is connected with the plenum chamber 22 of the torque sensor 14 by a centrally located axially extending channel 35 and at least one radially extending channel 36, both provided in the driving shaft A. The outlet of the pump 34 is further connected with the cylinder chamber 6 of the hydraulic cylinder and piston assembly which constitutes the adjusting unit 5 for the axially movable flange 2a of the sheave 2. The connection includes a conduit 37, a centrally located axially extending channel 38 in the-driven shaft B, and one or more substantially radially extending channels 39 also provided in the shaft B.

The plenum chamber 22 of the torque sensor 14 is connected with the cylinder chamber 9 of the cylinder and piston assembly constituting the adjusting unit 4 for the axially movable flange 1a of the sheave 1 by a channel 40 which is not located in the plane of FIG. 1 or 1a and, therefore, is indicated in these Figures by broken lines. This channel 40 is provided in the ring-shaped member 24 which is affixed to or of one piece with the driving shaft A. The channel 40 further establishes a permanent communication between the plenum chamber 22 of the torque sensor 14 and the cylinder chamber 9 of the adjusting unit 4 for the flange 1a of the sheave 1.

The driving shaft A is further provided with at least one channel 41 constituting an outlet for the flow of hydraulic fluid from the plenum chamber 22 of the torque sensor 14. The illustrated channel 41 communicates with or can be caused to communicate with the plenum chamber 22 at least in dependency upon the magnitude of transmitted torque. As shown in FIGS. 1 and 1a, the illustrated channel 41 extends at least substantially radially and communicates with a second centrally located axially exteding channel 42 of the driving shaft A. The channel 42 can be used as a means for conveying hydraulic fluid from the plenum chamber 22 to one or more component parts (e.g., to one or more friction clutches or brakes) forming part of the power train including the torque sensor 14 and the transmission including the sheaves 1, 2 and the flexible element 3. For example, the fluid leaving the plenum chamber 22 via channels 41, 42 can be used as a lubricant and/or as a coolant, also for the component parts of the transmission including the sheaves 1, 2 and the flexible element 3. Reference may be had to the commonly owned copending patent application Ser. No. 08/572,538 by Oswald Friedmann filed December, 14, 1995 for "Power Train".

The means for regulating the rate of flow of hydraulic fluid from the plenum chamber 22 by way of the channel or channels 41 (hereinafter referred to as channel or outlet) includes a radially inner portion 26a of the cam disc 19 (which latter is axially movable relative to the driving shaft A). The arrangement is such that the axial position of the cam disc 19 changes in response to changes in the magnitude of transmitted torque whereby the portion 26a of the disc 19 moves axially of the shaft A to throttle or to permit the flow of fluid from the plenum chamber 22 at least in dependency on the magnitude of such torque. It can be said that the portion 26a of the cam disc 19 and that portion of the driving shaft A which defines the channel or outlet 41 constitute a valve and more particularly a throttle valve or flow resrictor for hydraulic fluid leaving the plenum chamber 22 on its way toward one or more component parts which require cooling and/or lubrication.

The cam disc 19 acts not unlike a piston which moves axially of the driving shaft A at least in dependency upon the torque which is being transmitted between the cam discs 18 and 19 and thus effects an increase or a reduction of the rate of fluid flow from the plenum chamber 22 via outlet 41; this results in the establishment, at least in the plenum chamber 22, of a pressure of fluid (supplied by the pump 34) which is indicative at least of the magnitude of transmitted torque. Since the plenum chamber 22 is communicatively connected with the cylinder chamber 9 and with the cylinder chamber 6 (by way of passages 35 through 39), the fluid pressure in the chambers 6 and 9 is also indicative of the magnitude of transmitted torque.

Since the adjusting units 4 and 5 are connected in parallel with the respective adjusting units 10 and 11, the fluid pressure which is supplied for displacement of the axially movable flanges 1a, 2a of the sheaves 1, 2 generates forces which are added to the forces generated as a result of fluid pressure in the cylinder chambers 12 and 13 for the purposes of selecting a desired transmission ratio.

The cylinder chamber 12 of the adjusting unit 10 for the axially movable flange 1a of the sheave 1 receives pressurized hydraulic fluid from a discrete source 53 (e.g., a gear pump or a vane pump) by way of an axially parallel channel 43 which is provided in the driving shaft A, at least one substantially radially extending bore 44 which is also provided in the shaft A and communicates with the channel 43, a circumferentially extending (preferably circumferentiaily complete) peripheral groove 45 provided in the shaft A and communicating with the at least one bore 44, at least one channel 46 which is provided in the ring-shaped member 24 and communicates with the groove 45, and a substantially radially extending passage 47 provided in the sleeve-like member 21 and communicating with the cylinder chamber 12.

The connection between the pump 53 and the cylinder chamber 13 of the adjusting unit 11 for the axially movable flange 2a of the sheave 2 comprises a ring-shaped channel 48 which is provided in the driven shaft B and surrounds the centrally located channel 38, and at least one substantially radially extending channel or bore 49 also provided in the shaft B and connecting the channel 48 with the chamber 13. A conduit 51 connects the outlet of the pump 53 with the channel 43, and a conduit 52 connects the outlet of the pump 53 with the channel 48. A valve 50, or a system of valves, controls the flow of pressurized fluid from the pump 53, via conduits 51, 52, and into the channels 43, 48 of the shafts A and B, respectively.

The pump 53 constitutes an optional component part of the power train. If this pump is omitted, the power train comprises a valve 54 (shown in FIG. 1 by broken lines) or a system of valves serving to regulate the flow of pressurized hydraulic fluid from the pump 34 to the conduits 51 and 52. The valve 54 (which can comprise one or more discrete valves) serves to regulate the volumetric flow and/or the pressure of fluid flowing from the pump 34 into the conduits 51 and 52.

The second plenum chamber 23 of the torque sensor 14 is connected in parallel with the first plenum chamber 22, at least when the fluid in the chamber 23 is maintained under pressure. The plenum chamber 23 is sealed from the pump 34 when the transmission including the shaves 1, 2 and the flexible element 3 operates in such a way that the rotational speed of the sheave 2 assumes its lowermost value because the axially movable flanges 1a and 2a then assume the axial positions which are shown in the upper portions of the respective sheaves. The reason is that, at such times, the composite path defined by the channels, bores and/or analogous passages 55 through 60 does not permit hydraulic fluid to flow from the pump 34 (or an equivalent source of pressurized hydraulic fluid) to the plenum chamber 23. The axial position of the flange 1a is then such as shown in the upper portion of the sheave 1 of FIG. 1, i.e., the radially outer portion of the bore 60 in the driving shaft A is fully exposed so that the pressure of fluid in the plenum chamber 23 need not exceed atmospheric pressure. The axial force which the torque sensor 9 then transmits for the purposes of torque transmission and which is being applied to the cam discs, namely to the cam disc 19, is taken up only by the cushion of pressurized hydraulic fluid in the plenum chamber 22. The fluid pressure in the plenum chamber 22 is higher if the torque to be transmitted by the torque sensor 14 increases. As mentioned hereinbefore, such pressure is regulated by the throttle valve including the portion 26a of the part 26 of the cam disc 19 and that portion of the driving shaft A which defines the outlet or channel 41.

If the ratio of the transmission is to be increased, the flange 1a of the sheave 1 is moved axially of the driving shaft A in a direction toward the axially fixed flange 1b, and the flange 2a of the sheave 2 is moved axially of the driven shaft B and away from the axially fixed flange 2b. As already mentioned above, this results in a movement of the flange 1a toward or all the way to the position shown in the lower half of the shave 1 (as viewed in FIG. 1) and in a movement of the flange 2a toward or all the way to the position shown in the lower half of the sheave 2. Axial movements of the flanges 1a and 2a from the positions shown in the upper halves of the sheaves 1, 2 (as viewed in FIG. 1) toward the positions shown in the lower halves of the respective sheaves (i.e., to increase the ratio of the infinitely variable transmission) are initiated by the valve 50 which is actuated to permit pressurized hydraulic fluid to flow from the pump 53 (or from the pump 34 via valve 54 if the pump 53 is omitted) into the cylinder chamber 12 of the adjusting unit 10 while, at the same time, fluid is free to flow from the cylinder chamber 13 of the adjusting unit 11. In other words, the volume of fluid in the chamber 12 increases and the volume of fluid in the chamber 13 decreases.

The connections which enable the flanges 1a, 2a to move axially of but prevent these flanges from turning relative to the respective shafts A, B include toothed couplings 61 and 62.

That axial position of the flange 1a in which the ratio of the infinitely variable transmission assumes a maximum value is shown by solid lines in the lower half and by phantom lines in the upper half of the sheave 1 (as viewed in FIG. 1). The corresponding position of the upper portion of the flexible element 3 is shown by phantom lines in the upper half of the sheave 1, again as viewed in FIG. 1. The flange 2a assumes the axial position which is shown by phantom lines in the lower half and by solid lines in the upper half of the sheave 2 (as viewed in FIG. 1) when the ratio of the transmission is set at a minimum value.

The axially movable flange 1a of the shave 1 includes axially spaced apart centering portions 63, 64 which cooperate with the adjacent portions of the periphery of the driving shaft A, and the axially movable flange 2a of the sheave 2 comprises axially spaced apart centering portions 65, 66 which cooperate with the adjacent portions of the periphery of the driven shaft B. The arrangement is preferably such that the flanges 1a and 2a are movable axially of the respective shafts A and B without any, or without any appreciable, radial play. The centering portions 63, 64 of the flange 1a cooperate with those portions of the shaft A which define the adjacent radially outer ends of the channels or bores 59, 60 to form therewith a pair of valves. The flange 1a constitutes the axially movable valving element of each of these valves. If the flange 1a is caused to leave the solid-line position shown in the upper half of the shave 1 and to move in a diection to the right, as viewed in FIG. 1, it gradually overlies the radially outer end of the bore 60 to thus progressively throttle the flow of hydraulic fluid through such bore. When the flange 1a reaches an axial position in which its centering portion 64 seals the radially outer end of the bore 60, the other centering portion 63 seals the radially outer end of the bore or channel 59. If the flange 1a is caused to continue its axial movement toward the axially fixed flange 1b, the centering portion 64 continues to seal the radially outer end of the bore 60 but the centering portion 63 advances beyond and exposes the radially outer end of the bore 59. This establishes a gradually increasing connection for the flow of hydraulic fluid between the cylinder chamber 9 of the adjusting unit 4 and the channel 58 of the shaft A which, in turn, establishes a path for the flow of hydraulic fluid to the plenum chamber 23 through the passages 55, 56 and 57. At such time, the radially outer end of the bore 60 is at least substantially sealed (by the centering portion 64) while the plenum chambers 22, 23 are free to communicate with the cylinder chamber 9. Consequently, the pressure of hydraulic fluid in the plenum chambers 22, 23 matches the fluid pressure in the cylinder chamber 9 and also in the cylinder chamber 6 which is comunicatively connected with the pump 34 by the channel 35, by the conduit 37 and by channel 38. The difference, if any, between the fluid pressures in the plenum chambers 22, 23 and cylinder chamber 9 on the other hand and the cylinder chamber 6 on the other hand is attributable to losses due to friction between the fluid and the surfaces surrounding the respective path or paths.

Owing to the establishment of a transmission-ratio-dependent connection between the plenum chambers 22 and 23, the axially effective surface of the pressurized fluid cushion which develops in the torque sensor 14 is increased because the axially effective surfaces in the two plenum chambers 22, 23 are added to, i.e., superimposed upon, each other. Such increase of the overall dimensions of the axially effective supporting surface ensures that, if the magnitude of the torque remains unchanged, the pressure which is being built up by the torque sensor 14 is reduced at least substantially proportionally to the increase of the effective surface. This, in turn, means that the pressure of hydraulic fluid in the cylinder chambers 9 and 6 is reduced accordingly. Thus, the novel torque sensor 14 can be resorted to for transmission-ratio-dependent modulation of fluid pressure in superimposition upon that pressure modulation which is dependent upon the magnitude of transmitted torque. Otherwise stated, the novel torque sensor 14 permits or renders possible a practically two-stage modulation of the pressure or pressure level.

In the power train which is shown in FIGS. 1 and 1a, the mutual positions of the bores 59, 60 as well as their positions relative to the centering portions 63, 64 of the axially movable flange 1a are selected in such a way that the switching over from the establishment of fluid pressure only in the plenum chamber 22 to the establishment of fluid pressure in the plenum chambers 22, 23 or vice versa takes place when the ratio of the infinitely variable transmission including the shaves 1, 2 and the flexible element 9 is or approximates one-to-one. It is advisable to ensure that the shift from the plenum chamber 22 to the combination of plenum chambers 22, 23 or vice versa take place gradually rather than abruptly (for example or particularly for structural or constructional reasons). In other words, it is desirable to establish a transition stage during which the bore 60 is already sealed by the axially movable flange 1a while the bore 59 is still sealed from the cylinder chamber 9 of the adjusting unit 4. In order to ensure satisfactory operation of the torque sensor 14 and/or the infinitely variable transmission during such transitional stage, the cam disc 19 of the torque sensor 14 must be mounted with freedom of movability in the axial direction of the driving shaft A and the torque sensor comprises means for facilitating a change of the effective volume of the plenum chamber 23. This enables the torque sensor 14 to act not unlike a pump in that its component parts which can be said to constitute a piston and a cylinder are movable relative to each other. In the power train of FIGS. 1 and 1a, such (compensating) means for facilitating a change of the effective volume of the plenum chamber 23 is a so-called tongue- or lip seal 67 which is installed in a circumferentially extending annular recess or groove of the ring-shaped member 24 and contacts the adjacent cylindrical internal surface of the piston-like member 25. In other words, the part 67 can seal the plenum chambers 22, 23 from ech other.

The illustrated lip seal 67 is installed and designed in such a way that it can act as a one-way valve or check valve which permits fluid to flow from the plenum chamber 22 into the plenum chamber 23 but prevents the fluid from flowing in the opposite direction. In other words, if the fluid pressure in the plenum chamber 23 exceeds that in the plenum chamber 22, the seal or valve 67 permits an equalization of fluid pressure in the chambers 22 and 23. When the cam disc 19 is caused to move in a direction to the right, as viewed in FIGS. 1 and 1a, and when the plenum chamber 23 is otherwise sealed, fluid can flow from the plenum chamber 23 into the plenum chamber 22. If the cam disc 19 is thereupon caused to move axially in a direction to the left, again as viewed in FIGS. 1 and 1a, the pressure in the plenum chamber 23 can decrease (and the fluid, such as oil, can even contain bubbles of air or another gas) without adversely affecting the mode of operation of the torque sensor 14 and/or of the infinitely variable transmission including the sheaves 1, 2, the flexible element 3 and the adjusting units 4, 5 and 10, The lip seal 67 can be replaced by, or even utilized in conjunction with, a check valve or one-way valve of standard or any other suitable design. A check valve 168 is shown in the power train of FIG. 2. If a standard check valve is used in the power train of FIGS. 1 and 1a, it can be mounted in or on the ring-shaped member 24. In such instance, the illustrated lip seal 67 is or can be replaced with a seal which is effective at all times, i.e., which prevents hydraulic fluid from flowing between the plenum chambers 22, 23 in either direction. Still further, a check valve performing the function of the lip seal 67 and/or the valve 168 can be installed between the channels 35 and 58. All that counts is to ensure that the selected check valve or valves permit pressurized hydraulic fluid to flow from the plenum chamber 23 into the plenum chamber 22 but not in the opposite direction.

The preceding description of the power train which is shown in FIGS. 1 and 1a makes it clear that, practically within the entire range when the infinitely variable transmission acts as a step-down transmission (i.e., when the transmission can be said to constitute or operate as an underdrive), the axial force which is generated by the cams or ramps of the cam discs 18 and 19 is taken up only by the axially effective surface which develops in the plenum chamber 22. On the other hand, when the transmission acts as or constitutes an overdrive (i.e., when the transmission can be said to constitute a step-up transmission), the axial force which is furnished by the ramps or cams of the cam discs 18, 19 and acts upon the disc 19 is counteracted by axially effective surfaces in both plenum chambers. Thus, and if the input torque does not change, the pressure generated by the torque sensor 14 when the transmission acts as a step-down transmission is higher than the pressure which is generated by the torque sensor 14 when the transmission acts as a step-up transmission. As already mentioned hereinbefore, the infinitely variable transmission of FIGS. 1 and 1a is assumed to be designed in such a way that the switchover point, namely the timing of the establishment of a connection between the plenum chambers 22, 23 or of an interruption of such connection, takes place when the transmission ratio is or approximates one-to-one. However, such switchover point can be readily shifted in either direction, i.e., toward a higher or a lower transmission ratio, by the simple expedient of properly dimensioning and/or positioning the bores 59, 60 of the driving shaft A and/or the centering portions 63, 64 which are provided on the axially movable flange 1a and control the flow of hydraulic fluid through the respective bores. The term switchover point is not intended to always cover a single accurately defined axial position of the flange 1a but can also embrace a reasonable range of such axial positions.

It is equally within the purview of the invention to provide a special valve for the purpose of establishing and terminating a connection between the plenum chambers 22 and 23. To this end, the torque sensor 14 can be provided with a channel which establishes a path for the flow of hydraulic fluid between the plenum chambers 22, 23 and the valve can be installed in such conduit. The valve need not be actuated directly by the axially movable flange 1a or 2a but can receive signals for actuation from an externally located energy source. For example, the valve can constitute a hydraulically or pneumatically actuated or an electromagnetic valve which is actuated in dependency upon the transmission ratio or upon a change of the transmission ratio of the infinitely variable transmission. Highly satisfactory results can be obtained with a so-called 3/2-way valve which is installed to permit or to interrupt the flow of hydraulic fluid between the plenum chambers 22 and 23. The 3/2-way valve or another suitable valve could be installed in a conduit connecting the channels 35 and 58 of the driving shaft A. This would render it possible to seal or to dispense with the bores 59 and 60 of the shaft A. The valve would have to be installed and designed in such a way that it permits fluid to flow from the plenum chamber 23 when the plenum chambers 22 and 23 are sealed from each other. All that is necessary is to provide a connection for the flow of fluid from the plenum chamber 23 to the sump in response to appropriate setting of the valve, i.e., when the latter seals the plenum chambers 22, 23 from each other.

If the flow of fluid between the plenum chambers 22 23 and from the plenum chamber 23 to the sump or the like is controlled by a valve which can be regulated from the outside (e.g., electromagnetically), it is possible to change the setting of such valve in response to changes in one or more additional parameters. For example, the valve can be actuated in response to detection of abrupt changes (peaks) of torque being transmitted by the power train. This eliminates, or at least reduces, the likelihood of slip between the flexible element 3 and the flanges of the sheave 1 and/or 2, at least within certain ranges of operation, e.g., within certain ranges of the ratio of the infinitely variable transmission.

FIGS. 1 and 1a show that the torque sensor 14 is installed between the prime mover and the axially movable flange 1a of the sheave 1. However, the torque sensor can be readily adapted or modified for installation at one or more other locations, e.g., on the driven shaft B. For example, a torque sensor similar to or practically identical with the torque sensor 14 of FIGS. 1 and 1a can be installed adjacent to and downstream of the axially movable flange 2a of the sheave 2 on the driven shaft B. Still further, the power train can employ a plurality of torque sensors, for example, a first torque sensor on the driving shaft A ahead of the axially movable flange 1a (as seen in the direction of power flow) and a second torque sensor on the driven shaft B downstream of the axially movable flange 2a.

It is further possible to combine the novel torque sensor 14 (or an equivalent torque sensor having at least two plenum chambers) with other facilities which are provided to bring about a torque-dependent and/or a transmission-ratio-dependent modulation of fluid pressure. For example, the rolling elements 20 of the illustrated torque sensor 14 could be designed to move radially relative to the adjacent ramps or cam faces of the discs 18, 19 in response to changes of the ratio of the infinitely variable transmission, e.g., in a manner as disclosed in the aforementioned published German patent application No. 42 34 294.

FIG. 1 shows that the cylinder chamber 6 of the adjusting unit 5 for the flange 2a is connected with the torque sensor 14. However, it is also possible to connect the torque sensor 14 with the cylinder chamber 13 in the adjusting unit 11, i.e., to ensure that the pressure of hydraulic fluid in the cylinder chamber 13 is determined the torque sensor. The unit 5 including the cylinder chamber 6 then forms part of the means for changing the ratio of the infinitely variable transmission. All that is necessary in order to carry out the just outlined modifications of the transmission is to switch the connections for the conduits 37 and 52.

It is presently preferred to mass-produce several component parts of the torque sensor 14 from a suitable metallic sheet material. This also applies for the cam discs 18 and 19; such parts can be produced in a suitable stamping or embossing machine.

An important advantage of a torque sensor with a plurality of plenum chambers is that, at certain values of the operational parameter which determines the establishment or the interruption of a path for the flow of fluid between the plenum chambers, one ensures that the effective surface of the torque sensor which is being acted upon by pressurized fluid and generates an axial force can be increased in response to the establishment of a connection between the plenum chambers or reduced by the simple expedient of interrupting such connection. This, in turn, entails a change of adjusting pressure which is furnished by the torque sensor. Thus, and as already explained hereinbefore, when the torque sensor is to transmit a predetermined torque, the adjusting pressure (i.e., the pressure in the first plenum chamber) can be smaller when the two plenum chambers are connected to each other because the area of the surface which is then acted upon by pressurized fluid is greater than under operating conditions of the torque sensor when only the first plenum chamber receives fluid from the pump 34. The pressure of fluid in the second plenum chamber can be reduced all the way or at least close to zero whenever the operation of the torque sensor is such that only the first plenum chamber is connected with the source of pressurized fluid. This is achieved by the provision of the outlet for the flow of fluid from the second plenum chamber.

If the pump 34 or 53 is omitted, i.e., if only one of these pumps is used to furnish pressurized fluid for the plenum chambers 22, 23 as well as for the cylinder chambers 9, 6, 12 and 13, the single pump can be provided with two outlets for two fluid flows at different pressures. Alternatively, the conduit leading from a single outlet of a single pump can contain one or more valves which are designed to divide a single fluid stream into a plurality of streams which are maintained at different pressures.

It has been found that the provision of a pressure equalizing or compensating valve is particularly desirable and advantageous for a power train which embodies the infinitely variable ratio transmission with two adjustable sheaves and a torque sensor with at least two plenum chambers. Such valve is effective during that stage of operation of the torque sensor when the two plenum chambers are being connected to each other as well during that stage when the two plenum chambers are being separated or sealed from each other. The valve ensures that the torque sensor remains operative during the aforediscussed switchover or shifting instant or interval. The reasons are as follows: It is necessary that, before the plenum chambers 22, 23 are actually connected with each other, the outlet of the second plenum chamber be at least substantially sealed in order to avoid an excessive drop of fluid pressure at the torque sensor. For example, it is likely or possible that, when the outlet of the second plenum chamber is already sealed, the connection between the two plenum chambers its yet to be established. In the absence of the pressure equalizing valve, it would be impossible to carry out a pumping operation, namely an axial shifting of the cylinder and piston portions of the torque sensor because the second plenum chamber would be completely sealed and the hydralic fluid filling such second plenum chamber is incompressible. The compensating valve is preferably a check valve or one-way valve which can establish a path for the flow of fluid between the two plenum chambers when the pressure of fluid in one of the plenum chambers exceeds the pressure of fluid in the other plenum chamber by a preselected value. For example, the pressure differential between the two plenum chambers can be in the range of between 0.25 bar and 2 bar, particularly in the range between 0.3 bar and 0.7 bar. Highly satisfactory results were obtained when the valve was set to open at a pressure differential of at least close to 0.5 bar.

The improved torque sensor can be provided with more than two plenum chambers which are connectable to and sealable from each other in dependency upon changes of at least one operational parameter, e.g., the ratio of the infinitely variable ratio transmission. The arrangement can be such that all of the plural (more than two) plenum chambers can be communicatively connected to each other to operate in parallel (insofar as the resultant force generated by such torque sensor is concerned). However, it is equally possible to construct, assemble and operate a torque sensor with more than two plenum chambers so that only certain chambers can be connected to each other or sealed from one another under certain operating conditions. This renders it possible to enhance the versatility of the torque sensor in that a connection between a selected number of plenum chambers is established or sealed in response to development of certain operational parameters or in response to certain stages of a particular parameter.

Still further, it is possible to employ the improved torque sensor in conjunction with other types of transmissions. For example, the torque sensor can be combined with a transmission using spherical flanges having friction discs which are parallel to each other and have offset rotational axes. The discs flank spheres which are confined in cages and are shiftable in order to change or vary the ratio of the transmission. Still further, it is is possible to combine the improved torque sensor with a transmission using friction discs which are positioned to roll along each other and are rotatable about mutually inclined axes, e.g., about axes disposed at an angle of 90° to one another. All in all, the improved torque sensor can be put to use in conjunction with many or all kinds of frictionally operated infinitely variable ratio transmissions as well as with nuerous types of friction clutches wherein it is advisable to regulate the magnitude of transmitted torque in response to accurate monitoring of the applied torque.

An infinitely variable ratio transmission which can utilized in conjunction with the improved torque sensor is disclosed in U.S. Pat. No. 5,169,365 to Friedmann (incorporated herein by reference).

Figure 2:
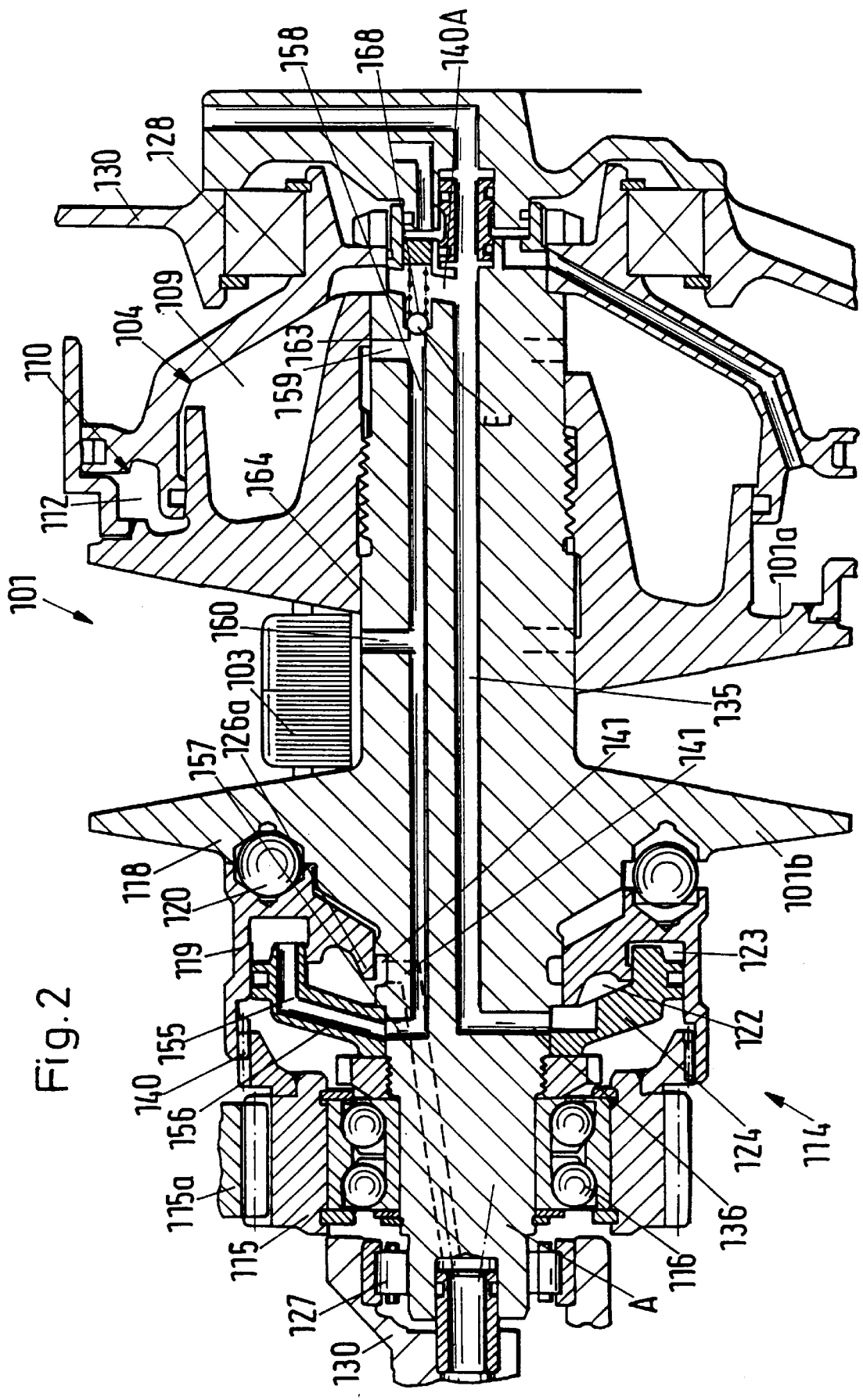
FIG. 2 is a fragmentary axial sectional view of a power train embodying a modified torque sensor.

FIG. 2 shows a portion of a modified power train wherein the infinitely variable transmission comprises a sheave 101 including an axially fixed flange 101b which is adjacent and can receive torque from a torque monitoring device or torque sensor 114. The latter again comprises two coaxial cam discs 118, 119 having confronting cam faces or ramps which engage a set of spherical spreading elements 120. The axially fixed cam disc 118 is shown as being of one piece with the axially fixed flange 101b of the sheave 101; however, it is equally possible to provide a separately produced cam disc 118 which abuts and is non-rotatably affixed to the flange 101b. The torque sensor 114 receives torque from a driver pinion 115 which, in turn, can be driven by a mating pinion 115a receiving torque from a prime mover, such as the combustion engine in a motor vehicle. The pinion 115 is rotatably mounted on the driving shaft A by way of a twin antifriction bearing 116, and the shaft A is rotatable in bearings 127, 128 which are installed in a housing 130.

The cam disc 119 of the torque sensor 114 can bear axially upon the:spreading elements 120 which, in turn, bear against the cam disc 118, i.e., against the axially fixed flange 101b. The pinion 115 can transmit torque to the cam disc 119 by way of a toothed connection 140 which is designed to enable the cam disc 119 to move axially of the shaft A. The illustrated toothed connection 140 comprises an externally splined cylindrical portion which is welded to or made of one piece with the driving pinion 115 and an internally splined cylindrical portion forming part of the cam disc 119 and mating with the externally splined portion.

The torque sensor 114 comprises a plurality of plenum chambers such as those shown at 122 and 123. These plenum chambers are connectable to and separable from each other in dependency upon the ratio of the infinitely variable transmission including the sheave 101. The manner in which the plenum chambers 122, 123 are put to use in the torque sensor 114 is the same as or clearly analogous to that described in connection with the plenum chambers 22, 23 of the torque sensor 14 shown in FIGS. 1 and 1a. The plenum chambers 122, 123 are defined in part by the ring-shaped member 124 and in part by the cam disc 119.

The torque sensor 114 receives pressurized hydraulic fluid from a suitable source corresponding to the pump 34 of FIG. 1. The pressurized fluid flowing from the source to the torque sensor 114 is caused to pass through a centrally located axially extending channel 135 of the shaft A, and the channel 135 can admit pressurized fluid into a substantially radially extending channel 136 leading into the plenum chamber 122.

The centrally located channel 135 of the shaft A further communicates with a substantially radially extending channel 140A which can admit pressurized fluid to the cylinder chamber 109 of the adjusting unit 104 for the axially movable flange 101a of the sheave 101. The channels 135, 136, 140A can establish a direct connection between the plenum chamber 122 and the cylinder chamber 109, i.e., the pressure of hydraulic fluid in the cylinder chamber 109 matches that in the plenum chamber 122. The adjusting unit 104 operates in parallel with an adjusting unit 110 having a cylinder chamber 112. The purposes of the adjusting units 104, 110 are identical with those of the adjusting units 4, 10 which were described in connection with FIGS. 1 and 1a.

A radially inner portion 126a of the axially movable cam disc 119 cooperates with that portion of the flange 101b which defines an outlet 141 to form a flow restrictor which permits an increase or causes a reduction of the rate of fluid flow from the plenum chamber 123 in dependency on the magnitude of torque to be transmitted by the torque sensor 114. In other words, the torque sensor 114 can select a fluid pressure which determines the magnitude of transmitted torque.

The path for the flow of hydraulic fluid between the plenum chambers 122, 123 is similar to that described in connection with the plenum chambers 22, 23 of FIGS. 1 and 1a. FIG. 2 shows passages in the form of bores and/or channels and/or conduits 155, 156, 157, 158, 159 and 160 which extend radially and/or axially of the shaft A and serve to establish or to interrupt a path for the flow of fluid between the plenum chambers 122, 123 in dependency upon the selected transmission ratio. The axially movable flange 101a of the sheave 101 again constitutes a reciprocable valving element which controls the flow of fluid in the channels 159 and 160 in a manner as already described with reference to the flange 1a of the sheave 1 shown in FIGS. 1 and 1a. The exact location or range of the aforediscussed switchover point depends upon the positions of the channels 159 and 160 relative to each other as well as upon the mutual positions of the centering portions 163, 164 on the flange 101a. In view of the fact that it communicates with the cylinder chamber 109 of the adjusting unit 104, the plenum chamber 123 can be said to operate in parallel with the plenum chamber 122.

The power train of FIG. 2 further comprises the aforediscussed check valve 168 which can be said to constitute a functional equivalent of the lip seal 67 shown in FIG. 1. This valve ensures an equalization of pressures during the establishment of communication between the plenum chambers 122, 123 as well as during interruption of such communication by providing a path for the flow of fluid between the conduits 158 and 135. Otherwise stated, the valve 168 prevents the fluid from flowing in a direction from the plenum chamber 122 toward the plenum chamber 123 ; however, once the pressure in the chamber 123 exceeds the pressure in the chamber 122 by a predetermined value, the valve 168 establishes a path for the flow of fluid from the chamber 123 into the chamber 122.

The construction of the infinitely variable transmission including the sheave 101 is or can be the same as that of the transmission including the sheaves 1, 2 and the flexible element 3 shown in FIG. 1. FIG. 2 merely shows that portion of the flexible element 103 which is trained over the sheave 101 but the other sheave is omitted.

In contrast to the construction of the power train which is shown in FIGS. 1 and 1a, the power train of FIG. 2 is constructed in such a way that the axially fixed flange 101b of the sheave 101 is disposed between the axially movable flange 101a and the torque sensor 114. The connection between the torque sensor 114 and the adjusting means for the axially movable flange 101a of the sheave 101 comprises the aforementioned centrally located channel 135 in the shaft A.

Figure 3:
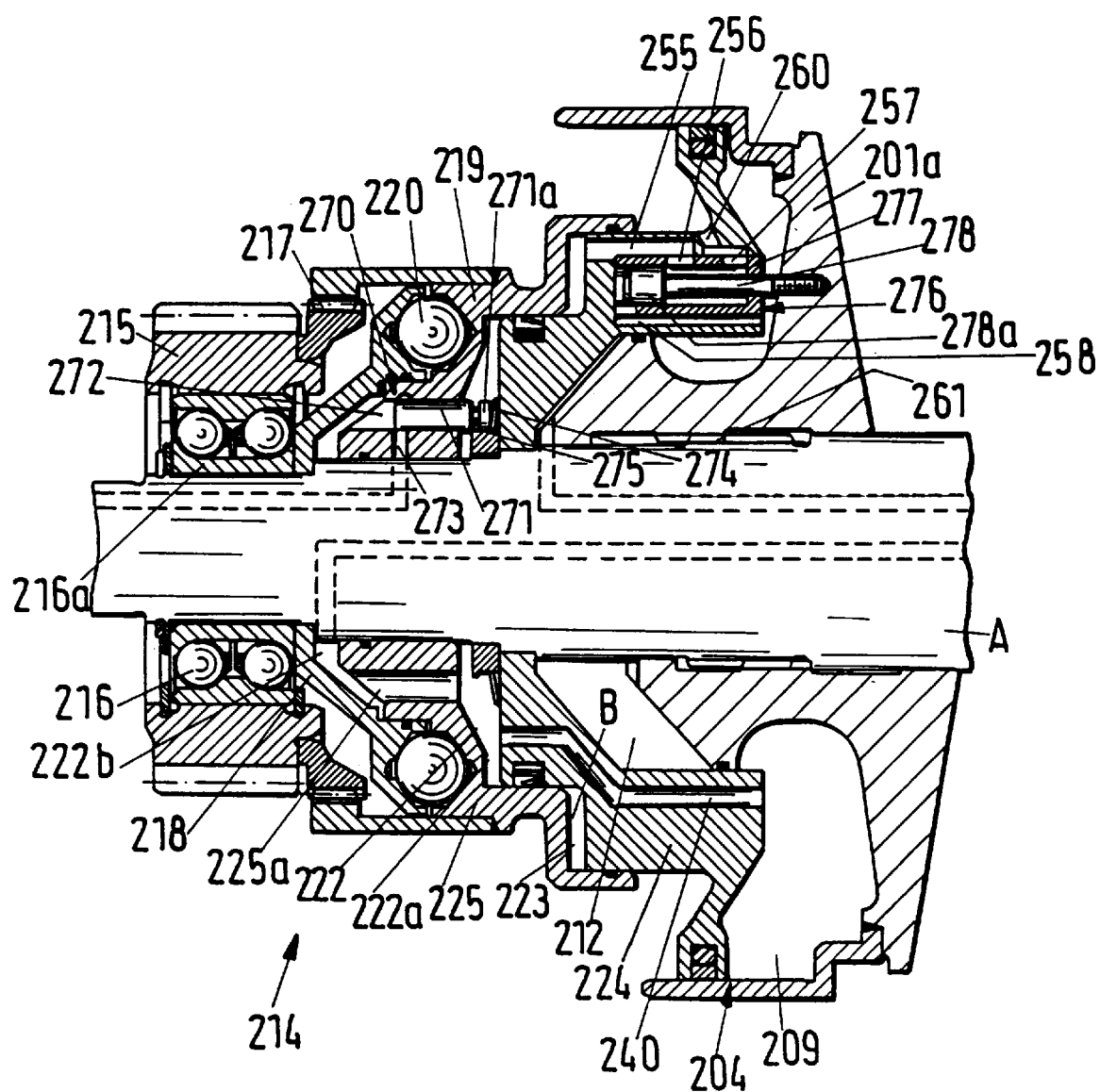
FIG. 3 is a fragmentary axial sectional view of a power train embodying a third torque sensor.

FIG. 3 shows a further torque sensor 214 and the axially movable flange 201a of one sheave of the infinitely variable transmission which cooperates with the torque sensor. The upper half of FIG. 3 shows the flange 201a in a position at a maximum axial distance and the lower half of FIG. 3 shows this flange at a minimum axial distance from the (non-illustrated) axially fixed flange. The connection between the flange 201a and the driving shaft A comprises an externally splined portion 261 which compels the flange 201a to share all angular movements of but permits this flange to move axially relative to the shaft A. The torque sensor 214 is installed in a manner similar to that described with reference to FIGS. 1 and 1a, namely between the driving pinion 215 and the axially movable flange 201a. The pinion 215 is form-lockingly connected with the axially movable cam disc 219 of the torque sensor 214 by a set of mating teeth 217 in a manner similar to that described with reference to the toothed connection 140 of FIG. 2. The cam disc 218 of the torque sensor 214 is held against axial movement relative to the shaft A in that it abuts the axially fixed inner race 216a of the antifriction bearing 216 surrounding the shaft A and being surrounded by the gear 215.

The adjusting units for the axially movable flange 201a comprise two cylinder chambers 209 and 212 which are installed between the flange 201a and a ring-shaped member 224 affixed to the shaft A. The pressure in the chamber 209 is indicative of the pressure established by the torque sensor 214 and the pressure in the chamber 212 is indicative of the desired or selected ratio of the infinitely variable transmission including the flange 201a. In contrast to the design of the torque sensors 14 and 114 shown in FIGS. 1–1a and 2, the cylinder chamber 209 in which the fluid pressure is determined by the torque sensor 214 is disposed radially outwardly of the cylinder chamber 212 wherein the fluid pressure reflects the selected ratio of the infinitely variable transmission. In other words, at least a portion of the chamber 209 has a diameter greater than the maximum diameter of the chamber 212.

The component parts of the torque sensor 214 define two plenum chambers 222, 223. The fluid in the plenum chamber 222 is always pressurized when the torque sensor 214 is called upon to transmit torque from a prime mover to the sheave including the flange 201a. The chamber 222 is defined by the ring-shaped member 224, by the cam disc 218 and a ring-shaped member 225 which is disposed between the parts 218, 224 and is rotatable relative to the shaft A. The parts 218, 224 cannot rotate relative to the shaft A. The axially movable ring-shaped member 225 forms part or or includes or constitutes the cam disc 219 of the torque sensor 214. The parts 218, 224 and 225 include axially extending portions which are interfitted into each other in order to establish the plenum chambers 222, 223. Sealing rings are installed between the aforementioned parts of the members 218, 224 (which do not move axially of the shaft A) and the aforementioned interfitted portion of the axially movable part 225.

The plenum chamber 222 is subdivided into two smaller chambers or compartments 222a, 222b which are connected to each other by a passage 225a in the form of a bore in the cam disc 219. The compartment 222b is located axially between the ring-shaped member 225 (i.e, the cam disc 219) and the cam disc 218, and the compartment 222a is located axially between the ring-shaped member 224 and the cam disc 219 (i.e., the axially movable valving element of the torque sensor 214). Otherwise stated, the compartments 222a and 22b are disposed at opposite sides of the cam disc 219 as seen in the axial direction of the driving shaft A.

FIG. 3 shows clearly that the effective radial surface of the compartment 222a is greater than that of the compartment 222b so that, due to such difference, it is possible to apply to the cam disc 219 a shifting or displacing force acting in the axial direction of the shaft A. Such force ensures that the spherical spreading elements 220 are clamped between the cams or ramps of the discs 218 and 219. A throttle valve 270 which determines the fluid pressure at least in the plenum chamber 222 and at least in dependency upon the momentarily transmitted torque is formed by a substantially pin-shaped projection 271 which is fixed to the shaft A and/or to the ring-shaped member 224 against movement in the axial direction and extends into a bore 272 in the axially movable cam disc 219 of the torque sensor 214. The bore 272 communicates with the compartment 222b of the plenum chamber 222. In addition, the bore 272 (which is at least substantially parallel to the axis of the shaft A) communicates with a substantially radially extending bore 273 which constitutes an outlet for hydraulic fluid. The flow of fluid through the bore 273 is throttled to a greater or lesser extent in dependency upon the torque being applied to the torque sensor 214; the actual throttling action is carried out by the projection 271. The effective cross-sectional area of the bore or outlet 273 is reduced if the torque is greater and vice versa. Thus, the plenum chamber 222 develops a cushion of hydraulic fluid (such as oil) which applies the required axial force to the cam disc 219, namely that axial force which is necessary for the transmission of torque. The pressure which prevails in the plenum chamber 222 is applied to the body of fluid in the cylinder chamber 209 by way of at least one connecting channel 240 which is provided in the ring-shaped member 224. The pin-shaped projection 271 of the throttle valve 270 has an end portion which is adjacent the ring-shaped member 224 and is held and positioned in such a way that it is mounted without axial play but with a certain amount of play in the radial direction. This ensures that the projection 271 can be accurately centered in the bore 272 during assembly of the throttle valve 270 and the torque sensor 214, i.e., this prevents or at least greatly reduces the likelihood of canting and jamming of the projection 271. In order to adequately fix the projection 271 in the axial direction, the latter comprises an end portion or head 271a which is adjacent the ring-shaped member 224 and is biased against a shoulder 275 by a resilient element here shown as a diaphragm spring 274. Such biasing further ensures that the projection 271 is adequately located in the radial direction but, if and when necessary, with limited freedom of radial movement.

The power train which is shown in FIG. 3 further comprises a switchover valve or reversing valve 276 which is mounted eccentrically of the torque sensor 214 and serves to establish communication between the plenum chambers 222 and 223, such as in dependency upon the ratio of the infinitely variable transmission including the flange 201a. The power train can comprise a plurality of switchover valves 276. The illustrated valve 276 comprises a housing or body 277 for an axially movable valving element or plunger 278. The latter is affixed to the axially movable flange 201a, and the valve housing or body 227 is affixed to the ring-shaped member 224, i.e., to the shaft A. When the flange 201a assumes that axial position which is shown in the upper half of FIG. 3 (i.e., when the infinitely variable transmission including the sheave which comprises the flange 201a is set to act as or to constitute an underdrive), the pressure in the plenum chamber 223 is reduced by way of the channels 255, 260 and the valve 276 which latter then establishes a path for the flow of fluid between such channels. To this end, the valve 276 is connected with the channel 255 at 256 and with the channel 260 at 257.

When the flange 201a is moved axially in a direction to the right as viewed in FIG. 3, namely toward the axial position shown in the lower half of FIG. 3, the flow regulating portion 278a of the valving element or plunger 278 first seals the port 256. As the movement of the flange 201a in a direction to the right (as viewed in FIG. 3) continues, the port 256 is gradually exposed but the regulating portion 278a then seals the port 256 from the channel or outlet 257 so that no fluid can flow through the channel or bore 260. When the port 256 is exposed again, the plenum chamber 223 communicates with the cylinder chamber 209, namely by way of channel 258 which communicates with the cylinder chamber 209 and extends to the switchover valve 276, the port 256 of the valve 276 and the channel 255. Thus, the cylinder chamber 209 then ensures that the pressure of fluid in the plenum chamber 223 matches the fluid pressure in the plenum chamber 222. The reason is that, in the power train of FIG. 3, the plenum chamber 222 is in direct communication with the cylinder chamber 209 of the adjusting unit for the flange 201a, namely by way of the channel 240. Thus, the pressure of the body of fluid in the plenum chamber 222 is communicated to the body of fluid in the plenum chamber 223 by way of the cylinder chamber 209. The cylinder chamber 209 of the fluid-operated adjusting unit 204 for the flange 201a receives hydraulic fluid by way of the illustrated torque sensor 214 or by way of one of several torque sensors.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. A fluid-operated torque sensor for use between a rotary torque transmitting driving member and a rotary torque receiving driven member to transmit at least a portion of torque from said driving member to said driven member, comprising a plenum chamber arranged to be filled with a pressurized fluid by a pump whereby the fluid pressure which develops in said chamber determines the torque being transmittable by the sensor; at least one throttle valve communicating with said chamber and comprising at least two components which are movable relative to each other to select the pressure of fluid in said chamber; first and second disc cams; and spreading elements between said cams, said first cam being fixed against movement in the direction of a predetermined axis and said second cam being movable in the direction of said axis and being non-rotatably but axially movably secured to a shaft of said driving member.

2. The sensor of claim 1, wherein said second cam includes a radially outer portion remote from said axis and facing away from said spreading elements as seen in the direction of said axis, said radially outer portion having a first toothed section mating with a complementary second toothed section of a member which is secured to said shaft against movement in the direction of as well as about said axis.

3. The sensor of claim 1, wherein at least one of said spreading elements includes a sphere.

* * * * *